US006423115B1

(12) United States Patent
McCarthy et al.

(10) Patent No.: US 6,423,115 B1
(45) Date of Patent: *Jul. 23, 2002

(54) DIRECT SMELTING PROCESS

(75) Inventors: Carolyn McCarthy, Palmyra; Rodney James Dry, City Beach; Peter Damian Burke, Winthrop; Robin John Batterham, Melbourne, all of (AU)

(73) Assignee: Technological Resources Pty Ltd, Melbourne (AU)

( * ) Notice: Subject to any disclaimer, the term of this patent is extended or adjusted under 35 U.S.C. 154(b) by 0 days.

This patent is subject to a terminal disclaimer.

(21) Appl. No.: 09/478,750

(22) Filed: Jan. 6, 2000

Related U.S. Application Data

(63) Continuation-in-part of application No. 09/462,282, filed as application No. PCT/AU99/00583 on Jul. 1, 1999, now abandoned.

(30) Foreign Application Priority Data

Jan. 8, 1999 (AU) ............................................... PP8055

(51) Int. Cl.[7] .............................................. C21B 11/00
(52) U.S. Cl. .............................. 75/414; 75/500; 75/501; 75/502
(58) Field of Search .......................... 75/500, 501, 502, 75/414

(56) References Cited

U.S. PATENT DOCUMENTS

| 2,647,045 A | 7/1953 | Rummel |
| 3,844,770 A | 10/1974 | Nixon |
| 3,845,190 A | 10/1974 | Yosim et al. |
| 3,888,194 A | 6/1975 | Kishigami et al. |

(List continued on next page.)

FOREIGN PATENT DOCUMENTS

| AU | A-23864/84 | 1/1984 |
| AU | B-41064/85 | 4/1986 |
| AU | B-69707/87 | 9/1987 |

(List continued on next page.)

OTHER PUBLICATIONS

Patent Abstract of Japan, JP, A, 10–280020 (Nippon Steel Corp.), Oct. 20, 1998.
Patent Abstracts of Japan, C–951, p. 24, JP, A, 04–63218 (Kawasaki Heavy Ind. Ltd), Feb. 28, 1992.

(List continued on next page.)

*Primary Examiner*—Melvyn Andrews
(74) *Attorney, Agent, or Firm*—Merchant & Gould, P.C.

(57) ABSTRACT

A direct smelting process for producing metals from a metalliferous feed material is disclosed. The process includes forming a molten bath having a metal layer (15) and a slag layer (16) on the metal layer in a metallurgical vessel, injecting metalliferous feed material and solid carbonaceous material into the metal layer via a plurality of lances/tuyeres (11), and smelting metalliferous material to metal in the metal layer. The process also includes causing molten material to be projected as splashes, droplets, and streams into a top space above a nominal quiescent surface of the molten bath to form a transition zone (23). The process also includes injecting an oxygen-containing gas into the vessel via one or more than one lance/tuyere (13) to post-combust reaction gases released from the molten bath, whereby the ascending and thereafter descending splashes, droplets and streams of molten material in the transition zone facilitate heat transfer to the molten bath, and whereby the transition zone minimises heat loss from the vessel via the side walls in contact with the transition zone. The process is controlled by maintaining a high slag inventory and by reducing the heat loss from the vessel through the side walls being continuously splashed by the transition zone.

30 Claims, 1 Drawing Sheet

U.S. PATENT DOCUMENTS

| | | |
|---|---|---|
| 3,890,908 A | 6/1975 | von Klenck et al. |
| 3,894,497 A | 7/1975 | Helke et al. |
| 4,007,034 A | 2/1977 | Hartwig et al. |
| 4,053,301 A | 10/1977 | Stephens, Jr. |
| 4,145,396 A | 3/1979 | Grantham |
| 4,177,063 A | 12/1979 | Dickson |
| 4,207,060 A | 6/1980 | Zangs |
| 4,356,035 A | 10/1982 | Brotzmann et al. |
| 4,389,043 A | 6/1983 | Weber et al. |
| 4,400,936 A | 8/1983 | Evans |
| 4,402,274 A | 9/1983 | Meenan et al. |
| 4,431,612 A | 2/1984 | Bell et al. |
| 4,447,262 A | 5/1984 | Gay et al. |
| 4,455,017 A | 6/1984 | Wunsche |
| 4,468,298 A | 8/1984 | Byrne et al. |
| 4,468,299 A | 8/1984 | Byrne et al. |
| 4,468,300 A | 8/1984 | Byrne et al. |
| 4,481,891 A | 11/1984 | Takeshita et al. |
| 4,504,043 A | 3/1985 | Yamaoka et al. |
| 4,511,396 A | 4/1985 | Nixon |
| 4,565,574 A | 1/1986 | Katayama et al. |
| 4,566,904 A | 1/1986 | von Bogdandy et al. |
| 4,572,482 A | 2/1986 | Bedell |
| 4,574,714 A | 3/1986 | Bach et al. |
| 4,602,574 A | 7/1986 | Bach et al. |
| 4,664,618 A | 5/1987 | Gitman |
| 4,681,599 A | 7/1987 | Obkircher |
| 4,684,448 A | 8/1987 | Itoh et al. |
| 4,701,214 A | 10/1987 | Kaneko et al. |
| 4,718,643 A | 1/1988 | Gitman |
| 4,786,321 A | 11/1988 | Hoster et al. |
| 4,790,516 A | 12/1988 | Sugiura et al. |
| 4,798,624 A | 1/1989 | Brotzmann et al. |
| 4,849,015 A | 7/1989 | Fassbinder et al. |
| 4,861,368 A | 8/1989 | Brotzmann et al. |
| 4,874,427 A | 10/1989 | Hamada et al. |
| 4,890,562 A | 1/1990 | Gitman |
| 4,913,734 A | 4/1990 | Romenets et al. |
| 4,923,391 A | 5/1990 | Gitman |
| 4,940,488 A | 7/1990 | Maeda et al. |
| 4,946,498 C1 | 8/1990 | Weber |
| RE33,464 E | 11/1990 | Gitman |
| 4,976,776 A | 12/1990 | Elvander et al. |
| 4,999,097 A | 3/1991 | Sadoway |
| 5,005,493 A | 4/1991 | Gitman |
| 5,024,737 A | 6/1991 | Claus et al. |
| 5,037,608 A | 8/1991 | Tarcy et al. |
| 5,042,964 A | 8/1991 | Gitman |
| 5,050,848 A | 9/1991 | Hardie et al. |
| 5,051,127 A | 9/1991 | Hardie et al. |
| 5,065,985 A | 11/1991 | Takahashi et al. |
| 5,177,304 A | 1/1993 | Nagel |
| 5,191,154 A | 3/1993 | Nagel |
| 5,222,448 A | 6/1993 | Morgenthaler et al. |
| 5,238,646 A | 8/1993 | Tarcy et al. |
| 5,271,341 A | 12/1993 | Wagner |
| 5,279,715 A | 1/1994 | La Camera et al. |
| 5,301,620 A | 4/1994 | Nagel et al. |
| 5,302,184 A | 4/1994 | Batterham et al. |
| 5,322,547 A | 6/1994 | Nagel et al. |
| 5,332,199 A | 7/1994 | Knapp et al. |
| 5,333,558 A | 8/1994 | Lees, Jr. |
| 5,396,850 A | 3/1995 | Conochie et al. |
| 5,401,295 A | 3/1995 | Brotzmann |
| 5,407,461 A | 4/1995 | Hardie et al. |
| 5,415,742 A | 5/1995 | La Camera et al. |
| 5,443,572 A | 8/1995 | Wilkison et al. |
| 5,480,473 A | 1/1996 | Hardie et al. |
| 5,489,325 A | 2/1996 | Keogh et al. |
| 5,498,277 A | 3/1996 | Floyd et al. |
| 5,518,523 A | 5/1996 | Brotzmann |
| 5,529,599 A | 6/1996 | Calderon |
| 5,613,997 A | 3/1997 | Satchell, Jr. |
| 5,640,708 A | 6/1997 | Conochie et al. |
| 5,647,888 A | 7/1997 | Keogh et al. |
| 5,741,349 A | 4/1998 | Hubble et al. |
| 5,800,592 A | 9/1998 | den Hartog et al. |
| 5,802,097 A | 9/1998 | Gensini et al. |
| 5,938,815 A | 8/1999 | Satchell, Jr. |
| 6,143,054 A | * 11/2000 | Dry .............................. 75/500 |

FOREIGN PATENT DOCUMENTS

| | | |
|---|---|---|
| AU | B-22448/88 | 5/1989 |
| AU | B-26831/88 | 7/1989 |
| AU | B-28802/89 | 8/1989 |
| AU | A-42859/89 | 4/1990 |
| AU | A-49307/90 | 9/1990 |
| AU | A-49309.90 | 9/1990 |
| AU | B-74840/91 | 10/1991 |
| AU | B-90957/91 | 8/1992 |
| AU | A-48938/93 | 4/1994 |
| AU | B-48937/93 | 5/1994 |
| AU | B-50820/96 | 1/1997 |
| DE | 3139375 | 4/1983 |
| DE | 3244744 | 5/1984 |
| EP | 079 182 A1 | 5/1983 |
| EP | 084 288 A1 | 7/1983 |
| EP | 422 309 A1 | 4/1991 |
| EP | 541 269 A1 | 5/1993 |
| EP | 592830 A1 | 4/1994 |
| EP | 657 550 | 6/1995 |
| GB | 2 043 696 A | 10/1980 |
| GB | 2 088 892 A | 6/1982 |
| WO | WO 89/01981 | 3/1989 |
| WO | WO 92/12265 | 7/1992 |
| WO | WO 93/06251 | 4/1993 |
| WO | WO 94/19497 | 9/1994 |
| WO | WO 96/19591 | 6/1996 |
| WO | WO 96/31627 | 10/1996 |
| WO | WO 97/17473 | 5/1997 |
| WO | WO 97/20958 | 6/1997 |
| WO | WO 97/23656 | 7/1997 |
| WO | WO 98/27232 | 6/1998 |
| WO | WO 98/27239 | 6/1998 |
| WO | WO 99/16911 | 4/1999 |

OTHER PUBLICATIONS

Patent Abstracts of Japan, C–627, p. 109, Jp, A, 01–127613 (Kawasaki Steel Corp.), May 19, 1989.

WPAT print-out for Brazilian patent application P19400123–5 (Weber).

Patent Abstracts of Japan, C–951, JP, A, 4–63217 (Kawasaki Heavy Ind. Ltd.), Feb. 28, 1992.

Derwent Abstract Accession No. 87–039748/06 Class Q77, JP, A, 61–295334, Dec. 26, 1986.

Patent abstracts of Japan, C–497, p. 115, Jp, A, 62–280315 (Nippon Kokan K.K), Dec. 15, 1987.

* cited by examiner

DIRECT SMELTING PROCESS

This is a continuation-in-part application of application Ser. No. 09/462,282, filed Mar. 16, 2000, now abandoned entitled DIRECT SMELTING PROCESS which entered the national phase on Jan. 5, 2000, which is a national phase application of PCT/AU99/00583 filed on Jul. 1, 1999.

The present invention relates to a process for producing molten metal (which term includes metal alloys), in particular although by no means exclusively iron, from metalliferous feed material, such as ores, partly reduced ores and metal-containing waste streams, in a metallurgical vessel containing a molten bath.

The present invention relates particularly to a molten metal bath-based direct smelting process for producing molten metal from a metalliferous feed material.

BACKGROUND OF THE INVENTION

The most widely used process for producing molten metal is based on the use of a blast furnace. Solid material is charged into the top of the furnace and molten iron is tapped from the hearth. The solid material includes iron ore (in sinter, lump or pellet form), coke, and fluxes and forms a permeable burden that moves downwardly. Preheated air, which may be oxygen enriched, is injected into the bottom of the furnace and moves upwardly through the permeable bed and generates carbon monoxide and heat by combustion of coke. The result of these reactions is to produce molten iron and slag.

A process that produces iron by reduction of iron ore below the melting point of the iron produced is generally classified as a "direct reduction process" and the product is referred to as DRI.

The FIOR (Fluid Iron Ore Reduction) process is an example of direct reduction process. The process reduces iron ore fines as the fines are gravity-fed through each reactor in a series of fluid bed reactors. The fines are reduced by compressed reducing gas that enters the bottom of the lowest reactor in the series and flows counter-current to the downward movement of fines.

Other direct reduction processes include moving shaft furnace-based processes, static shaft furnace-based processes, rotary hearth-based processes, rotary kiln-based processes, and retort-based processes.

The COREX process produces molten iron directly from coal without the blast furnace requirement of coke. The process includes 2-stage operation in which:

(a) DRI is produced in a shaft furnace from a permeable bed of iron ore (in lump or pellet form), coal and fluxes; and (b) the DRI is then charged without cooling into a connected melter gasifier.

Partial combustion of coal in the fluidised bed of the melter gasifier produces reducing gas for the shaft furnace.

Another known group of processes for producing molten iron is based on cyclone converters in which iron ore is melted by combustion of oxygen and reducing gas in an upper melting cyclone and is smelted in a lower smelter containing a bath of molten iron. The lower smelter generates the reducing gas for the upper melting cyclone.

A process that produces molten metal directly from ores is generally referred to as a "direct smelting process".

One known group of direct smelting processes is based on the use of electric furnaces as the major source of energy for the smelting reactions.

Another known direct smelting process, which is generally referred to as the Romelt process, is based on the use of a large volume, highly agitated slag bath as the medium for smelting top-charged metal oxides to metal and for post-combusting gaseous reaction products and transferring the heat as required to continue smelting metal oxides. The Romelt process includes injection of oxygen enriched air or oxygen into the slag via a lower row of tuyeres to provide slag agitation and injection of oxygen into the slag via an upper row of tuyeres to promote post-combustion. In the Romelt process the metal layer is not an important reaction medium.

Another known group of direct smelting processes that are slag-based is generally described as "deep slag" processes. These processes, such as DIOS and AISI processes, are based on forming a deep layer of slag with 3 regions, namely: an upper region for post-combusting reaction gases with injected oxygen; a lower region for smelting metal oxides to metal; and an intermediate region which separates the upper and lower regions. As with the Romelt process, the metal layer below the slag layer is not an important reaction medium.

Another known direct smelting process which relies on a molten metal layer as a reaction medium, and is generally referred to as the HIsmelt process, is described in International application PCT/AU96/00197 (WO 96/31627) in the name of the applicant.

The HIsmelt process as described in the International application comprises:

(a) forming a bath of molten iron and slag in a vessel;

(b) injecting into the bath:
  (i) metalliferous feed material, typically metal oxides; and
  (ii) a solid carbonaceous material, typically coal, which acts as a reductant of the metal oxides and a source of energy; and (c) smelting the metalliferous feed material to metal in the metal layer.

The HIsmelt process also comprises post-combusting reaction gases, such as CO and $H_2$, released from the bath in the space above the bath with oxygen-containing gas and transferring the heat generated by the post-combustion to the bath to contribute to the thermal energy required to smelt the metalliferous feed materials.

The HIsmelt process also comprises forming a transition zone above the nominal quiescent surface of the bath in which there is a favourable mass of ascending and thereafter descending droplets or splashes or streams of molten metal and/or slag which provide an effective medium to transfer to the bath the thermal energy generated by post-combusting reaction gases above the bath.

The HIsmelt process as described in the International application is characterised by forming the transition zone by injecting a carrier gas and metalliferous feed material and/or solid carbonaceous material and/or other solid material into the bath through a section of the side of the vessel that is in contact with the bath and/or from above the bath so that the carrier gas and the solid material penetrate the bath and cause molten metal and/or slag to be projected into the space above the surface of the bath.

The HIsmelt process as described in the International application is an improvement over earlier forms of the HIsmelt process which form the transition zone by bottom injection of gas and/or carbonaceous material into the bath which causes droplets and splashes and streams of molten metal and slag to be projected from the bath.

SUMMARY OF THE INVENTION

This applicant has carried out extensive pilot plant work on the HIsmelt process and has made a series of significant findings in relation to the process.

In general terms, the present invention provides a direct smelting process for producing metals from a metalliferous feed material which includes the steps of:

(a) forming a molten bath having a metal layer and a slag layer on the metal layer in a metallurgical vessel;

(b) injecting metalliferous feed material and solid carbonaceous material into the metal layer via a plurality of lances/tuyeres;

(c) smelting metalliferous material to metal in the metal layer;

(d) causing molten material to be projected as splashes, droplets, and streams into a space above a nominal quiescent surface of the molten bath to form a transition zone; and (e) injecting an oxygen-containing gas into the vessel via one or more than one lance/tuyere to post-combust reaction gases released from the molten bath, whereby the ascending and thereafter descending splashes, droplets and streams of molten material in the transition zone facilitate heat transfer to the molten bath, and whereby the transition zone minimises heat loss from the vessel via the side walls in contact with the transition zone;

and includes the step of controlling the process by maintaining a high slag inventory.

The invention further provides a direct smelting process for producing metals from a metalliferous feed material which includes the steps of:

(a) forming a molten bath having a metal layer and a slag layer on the metal layer in a metallurgical vessel having side walls, said slag layer providing a high inventory in the vessel;

(b) injecting metalliferous feed material and solid carbonaceous material into the metal layer via a plurality of lances/tuyeres;

(c) smelting metalliferous material to metal in the metal layer;

(d) generating a gas flow from the metal layer at a flow rate of at least 0.04 $Nm^3/s/m^2$ of the metal layer area at the interface between the metal layer and the slag layer (under quiescent conditions), which gas flow causes molten material to be projected as splashes, droplets, and streams into a space above a nominal quiescent surface of the molten bath to form a transition zone, the molten material and particularly the slag of the transition zone continuously splashing the side walls and reducing heat loss via the side walls; and (e) injecting an oxygen-containing gas into the vessel via one or more than one lance/tuyere to post-combust reaction gases released from the molten bath, whereby the ascending and thereafter descending splashes, droplets and streams of molten material in the transition zone facilitate heat transfer to the molten bath, and whereby the transition zone minimises heat loss from the vessel via the side walls in contact with the transition zone.

The above-described gas flow rate from the metal layer of at least 0.04 $Nm^3/s/m^2$ area of the metal layer is a substantially higher bath-derived gas flow rate than the rate recommended to successfully operate the Romelt, DIOS, and AISI processes as described above and is a significant difference between the process of the present invention and these known direct smelting processes.

The term "smelting" is understood herein to mean thermal processing wherein chemical reactions that reduce the metalliferous feed material take place to produce liquid metal.

The term "quiescent surface" in the context of the molten bath is understood to mean the surface of the molten bath under process conditions in which there is no gas/solids injection and therefore no bath agitation.

The space above the nominal quiescent surface of the molten bath is hereinafter referred to as the "top space".

A significant outcome of the pilot plant work is that it is important to maintain high levels of slag in the vessel (and more particularly in the transition zone) and to generate sufficient gas flow from the metal layer such that the side walls are continuously splashed by molten material, particularly slag, in the transition zone in order to control heat losses from the vessel. The importance of slag to the HIsmelt process is a significant departure from previous work on the HIsmelt process. In the previous work the amount of slag was not considered to be as important to the process.

Preferably the gas flow rate is at least 0.2 $Nm^3/s/m^2$ of the metal layer area.

Preferably the gas flow rate is less than 2 $Nm^3/s/m^2$.

The gas flow from the metal layer may be caused by any one or more of a number of factors. For example, gas flow may be generated at least in part as a result of injection of metalliferous feed material and solid carbonaceous material into the metal layer. By way of further example, the gas flow may be generated at least in part as a result of injection of a carrier gas into the metal layer with injected metalliferous feed material and/or solid carbonaceous material. By way of further example, gas flow may be generated at least in part as a result of bottom and/or side wall injection of a gas into the metal layer.

Preferably the gas flow rate of at least 0.04 $Nm^3/s/m^2$ of the metal layer area forms a metal-rich transition zone above the metal layer and a slag-rich transition zone above the metal-rich transition zone.

The concept of a "high slag inventory" may be understood in the context of the depth of the slag layer in the vessel.

Preferably the process includes maintaining the high slag inventory by controlling the slag layer to be 0.5 to 4 meters deep under stable operating conditions.

More preferably the process includes maintaining the high slag inventory by controlling the slag layer to be 1.5 to 2.5 meters deep under stable operating conditions.

It is preferred particularly that the process includes maintaining the high slag inventory by controlling the slag layer to be at least 1.5 meters deep under stable operating conditions.

The concept of a "high slag inventory" may also be understood in the context of the amount of slag compared to the amount of metal in the vessel.

Preferably, when the process is operating under stable conditions, the process includes maintaining the high slag inventory by controlling the weight ratio of metal:slag to be between 4:1 and 1:2.

More preferably the process includes maintaining the high slag inventory by controlling the weight ratio of metal:slag to be between 3:1 and 1:1.

It is preferred particularly that the process includes maintaining the high slag inventory by controlling the metal:slag weight ratio to be between 3:1 and 2:1.

The amount of slag in the vessel, ie the slag inventory, has a direct impact on the amount of slag that is in the transition zone.

The relatively low heat transfer characteristics of slag compared to metal is important in the context of minimising heat loss from the transition zone to the side walls and from the vessel via the side walls of the vessel.

By appropriate process control, slag in the transition zone can form a layer or layers on the side walls that adds resistance to heat loss from the side walls.

Therefore, by changing the slag inventory it is possible to increase or decrease the amount of slag in the transition zone and on the side walls and therefore control the heat loss via the side walls of the vessel.

The slag may form a "wet" layer or a "dry" layer on the side walls. A "wet" layer comprises a frozen layer that adheres to the side walls, a semi-solid (mush) layer, and an outer liquid film. A "dry" layer is one in which substantially all of the slag is frozen.

The amount of slag in the vessel also provides a measure of control over the extent of post combustion.

Specifically, if the slag inventory is too low there will be increased exposure of metal in the transition zone and therefore increased oxidation of metal and dissolved carbon in metal and the potential for reduced post-combustion and consequential decreased post combustion, notwithstanding the positive effect that metal in the transition zone has on heat transfer to the metal layer.

In addition, if the slag inventory is too high the one or more than one oxygen-containing gas injection lance/tuyere will be buried in the transition zone and this minimises movement of top space reaction gases to the end of the or each lance/tuyere and, as a consequence, reduces potential for post-combustion.

The amount of slag in the vessel, ie the slag inventory, measured in terms of the depth of the slag layer or the weight ratio of metal:slag, may be controlled by the tapping rates of metal and slag.

The production of slag in the vessel may be controlled by varying the feed rates of metalliferous feed material, carbonaceous material, and fluxes to the vessel and operating parameters such as oxygen-containing gas injection rates.

The process of the present invention is characterised by controlling heat transfer via the transition zone to the metal layer and controlling heat loss from the vessel via the transition zone.

As noted above, in particular the present invention is preferably characterised by controlling the process by maintaining a high slag inventory.

In addition, the present invention is more preferably characterised by controlling the process by means of the following process features, separately or in combination;

(a) locating the one or more than one oxygen-containing gas injection lance/tuyere and injecting the oxygen-containing gas at a flow rate so that:
  (i) the oxygen-containing gas is injected towards the slag layer and penetrates the transition zone; and
  (ii) the stream of oxygen-containing gas deflects the splashes, droplets and streams of molten material around a lower section of the or each lance/tuyere and a gas continuous space described as a "free space" forms around the end of the or each lance/tuyere;

(b) controlling heat loss from the vessel by splashing predominantly slag onto the side walls of the vessel in contact with the transition zone by adjusting one or more of:
  (i) the amount of slag in the molten bath;
  (ii) the injection flow rate of the oxygen-containing gas through the one or more than one oxygen-containing gas injection lance/tuyere; and
  (iii) the flow rate of metalliferous feed material and carbonaceous material through the lances/tuyeres.

In situations where the metalliferous feed material is an iron-containing material, the present invention is also preferably characterised by controlling the process by controlling the level of dissolved carbon in molten iron to be at least 3 wt % and maintaining the slag in a strongly reducing condition leading to FeO levels of less than 6 wt %, more preferably less than 5 wt %, in the slag layer and in the transition zone.

Preferably, the metallurgical vessel includes:

(a) the above-described one or more than one lance/tuyere for injecting oxygen-containing gas and the lances/tuyeres for injecting solid materials, such as metalliferous material, carbonaceous material (typically coal) and fluxes, into the vessel;

(b) outlets for discharging molten metal and slag from the vessel; and (c) one or more off-gas outlet.

In order to operate the process it is essential that the vessel contains a molten bath having a metal layer and a slag layer on the metal layer.

The term "metal layer" is understood herein to mean that region of the bath that is predominantly metal.

The term "slag layer" is understood herein to mean that region of the bath that is predominantly slag.

An important feature of the process of the present invention is that metalliferous material is smelted to metal at least predominantly in the metal layer of the molten bath.

In practice, there will be a proportion of the metalliferous material that is smelted to metal in other regions of the vessel, such as the slag layer. However, the objective of the process of the present invention, and an important difference between the process and prior art processes, is to maximise smelting of metalliferous material in the metal layer.

As a consequence of the above, the process includes injecting metalliferous material and carbonaceous material, which acts as a source of reductant and as a source of energy, into the metal layer.

One option is to inject metalliferous material and carbonaceous material via lances/tuyeres positioned above and extending downwardly towards the metal layer. Typically, the lances/tuyeres extend through side walls of the vessel and are angled inwardly and downwardly towards the surface of the metal layer.

Another option, although by no means not the only other option, is to inject metalliferous material and carbonaceous material via tuyeres in the bottom of the vessel or in side walls of the vessel that contact the metal layer.

The injection of metalliferous material and carbonaceous material may be through the same or separate lances/tuyeres.

Another important feature of the process of the present invention is that it causes molten material, typically in the form of splashes, droplets, and streams, to be projected upwardly from the molten bath into at least part of the top space above the quiescent surface of the bath to form the transition zone.

The transition zone is quite different to the slag layer. By way of explanation, under stable operating conditions of the process the slag layer comprises gas bubbles in a liquid continuous volume whereas the transition zone comprises splashes, droplets, and streams of molten material in a gas continuous volume.

Preferably the process includes causing molten material to be projected as splashes, droplets and streams into the top space above the transition zone.

Another important feature of the present invention is that it post-combusts reaction gases, such as carbon monoxide and hydrogen, generated in the molten bath, in the top space (including the transition zone) above the nominal quiescent surface of the bath and transfers the heat generated by the post-combustion to the metal layer to maintain the temperature of the molten bath—as is essential in view of endothermic reactions in that layer.

Preferably the oxygen-containing gas is air.

More preferably the air is pre-heated.

Typically, the air is preheated to 1200° C.

The air may be oxygen enriched.

Preferably the level of post-combustion is at least 40%, where post-combustion is defined as:

$$\frac{[CO_2]+[H_2O]}{[CO_2]+[H_2O]+[CO]+[H_2]}$$

where:

[$CO_2$]=volume % of $CO_2$ in off-gas
[$H_2O$]=volume % of $H_2O$ in off-gas
[CO]=volume % of CO in off-gas
[$H_2$]=volume % of $H_2$ in off-gas The transition zone is important for 2 reasons.

Firstly, the ascending and thereafter descending splashes, droplets and streams of molten material are an effective means of transferring to the molten bath the heat generated by post-combustion of reaction gases in the top space above the quiescent surface of the bath.

Secondly, the molten material, and particularly the slag, in the transition zone is an effective means of minimising heat loss via the side walls of the vessel.

A fundamental difference between the process of the present invention and prior art processes is that in the process of the present invention the main smelting region is the metal layer and the main oxidation (ie heat generation) region is above and in the transition zone and these regions are spatially well separated and heat transfer is via physical movement of molten metal and slag between the two regions.

Preferably the transition zone is generated by injecting metalliferous material and carbonaceous material in a carrier gas through lances/tuyeres that extend downwardly towards the metal layer.

More preferably, as noted above, lances/tuyeres extend through the side walls of the vessel and are angled inwardly and downwardly towards the metal layer.

This injection of the solid material towards and thereafter into the metal layer has the following consequences:

(a) the momentum of the solid material/carrier gas causes the solid material and gas to penetrate the metal layer;

(b) the carbonaceous material, typically coal, is devolatilised and thereby produces gas in the metal layer;

(c) carbon predominantly dissolves into the metal and partially remains as solid;

(d) the metalliferous material is smelted to metal by carbon derived from injected carbon as described above in item (c) and the smelting reaction generates carbon monoxide gas; and (e) the gases transported into the metal layer and generated via devolatilisation and smelting produce significant buoyancy uplift of molten metal, solid carbon and slag (which is drawn into the metal layer as a consequence of solid/gas injection) from the metal layer which results in upward movement of splashes, droplets and streams of molten metal and slag, and these splashes, droplets, and streams entrain further slag as they move through the slag layer.

Another important feature of the present invention is that the location and operating parameters of the one or more than one lance/tuyere that injects the oxygen-containing gas and the operating parameters that control the transition zone are selected so that:

(a) the oxygen-containing gas is injected towards the slag layer and penetrates the transition zone;

(b) the stream of oxygen-containing gas deflects the splashes, droplets and streams of molten material so that, in effect:

(i) the transition zone extends upwardly around the lower section of the one or more than one lance/tuyere; and (ii) a gas continuous space described as a "free space" forms around the end of the one or more than one lance/tuyere.

The formation of the free space is an important feature because it makes it possible for reaction gases in the top space of the vessel to be drawn into the region of the end of the one or more than one oxygen-containing gas injection lance/tuyere and to be post-combusted in the region. In this context, the term "free space" is understood to mean a space which contains practically no metal and slag.

In addition, the above-described deflection of molten material shields to some degree the side walls of the vessel from the combustion zone generated at the end of the or each lance/tuyere. Also it provides a means for returning more energy back to the bath from gases post combusted in the top space.

Preferably the process includes injecting the oxygen-containing gas into the vessel in a swirling motion.

BRIEF DESCRIPTION OF THE DRAWINGS

The present invention is described further by way of example with reference to the accompanying drawing which is a vertical section through a metallurgical vessel illustrating in schematic form a preferred embodiment of the process of the present invention.

DETAILED DESCRIPTION OF THE PREFERRED EMBODIMENT

Figure 1:
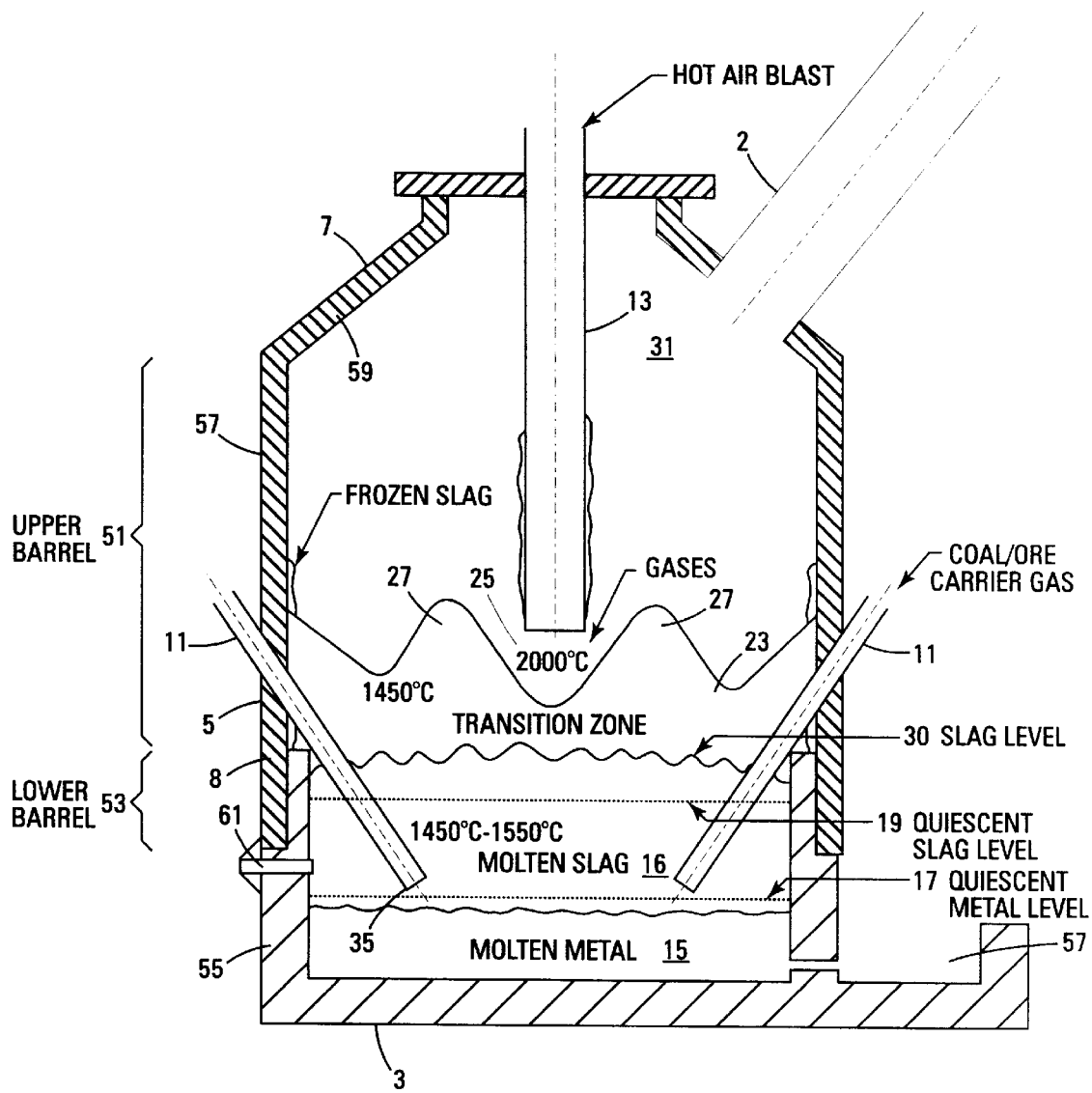

The following description is in the context of smelting iron ore to produce molten iron and it is understood that the present invention is not limited to this application and is applicable to any suitable metallic ores and/or concentrates—including partially reduced metallic ores and waste revert materials.

The vessel shown in the figure has a hearth that includes a base 3 and sides 55 formed from refractory bricks; side walls 5 which form a generally cylindrical barrel extending upwardly from the sides 55 of the hearth and which include an upper barrel section 51 and a lower barrel section 53; a roof 7; an outlet 9 for off-gases; a forehearth 57 for discharging molten metal continuously; and a tap-hole 61 for discharging molten slag.

In use, the vessel contains a molten bath of iron and slag which includes a layer 15 of molten metal and a layer 16 of molten slag on the metal layer 15. The arrow marked by the numeral 17 indicates the position of the nominal quiescent surface of the metal layer 15 and the arrow marked by the numeral 19 indicates the position of nominal quiescent surface of the slag layer 16. The term "quiescent surface" is understood to mean the surface when there is no injection of gas and solids into the vessel.

The vessel also includes 2 solids injection lances/tuyeres 11 extending downwardly and inwardly at an angle of 30–60° to the vertical through the side walls 5 and into the slag layer 16. The position of the lances/tuyeres 11 is selected so that the lower ends are above the quiescent surface 17 of the metal layer 15.

In use, iron ore, solid carbonaceous material (typically coal), and fluxes (typically lime and magnesia) entrained in a carrier gas (typically $N_2$) are injected into the metal layer 15 via the lances/tuyeres 11. The momentum of the solid material/carrier gas causes the solid material and gas to penetrate the metal layer 15. The coal is devolatilised and thereby produces gas in the metal layer 15. Carbon partially dissolves into the metal and partially remains as solid carbon. The iron ore is smelted to metal and the smelting reaction generates carbon monoxide gas. The gases transported into the metal layer 15 and generated via devolatilisation and smelting produce significant buoyancy uplift of molten metal, solid carbon, and slag (drawn into the metal layer 15 as a consequence of solid/gas/injection) from the metal layer 15 which generates an upward movement of splashes, droplets and streams of molten metal and slag, and these splashes, and droplets, and streams entrain slag as they move through the slag layer 16.

The buoyancy uplift of molten metal, solid carbon and slag causes substantial agitation in the metal layer 15 and the slag layer 16, with the result that the slag layer 16 expands in volume and has a surface indicated by the arrow 30. The extent of agitation is such that there is reasonably uniform temperature in the metal and the slag regions—typically, 1450–1550° C. with a temperature variation of the order of 30° in each region.

In addition, the upward movement of splashes, droplets and streams of molten material caused by the buoyancy uplift of molten metal, solid carbon, and slag extends into the top space 31 above the molten bath in the vessel and:

(a) forms a transition zone 23; and (b) projects some molten material (predominantly slag) beyond the transition zone and onto the part of the upper barrel section 51 of the side walls 5 that is above the transition zone 23 and onto the roof 7.

In general terms, the slag layer 16 is a liquid continuous volume, with gas bubbles therein, and the transition zone 23 is a gas continuous volume with splashes, droplets, and streams of molten metal and slag.

The vessel further includes a lance 13 for injecting an oxygen-containing gas (typically pre-heated oxygen enriched air) which is centrally located and extends vertically downwardly into the vessel. The position of the lance 13 and the gas flow rate through the lance 13 are selected so that the oxygen-containing gas penetrates the central region of the transition zone 23 and maintains an essentially metal/slag free space 25 around the end of the lance 13. The lance 13 includes an assembly which causes the oxygen-containing gas to be injected in a swirling motion into the vessel.

The injection of the oxygen-containing gas via the lance 13 post-combusts reaction gases CO and $H_2$ in the transition zone 23 and in the free space 25 around the end of the lance 13 and generates high temperatures of the order of 2000° C. or higher in the gas space. The heat is transferred to the ascending and descending splashes droplets, and streams, of molten material in the region of gas injection and the heat is then partially transferred to the metal layer 15 when the metal/slag returns to the metal layer 15.

The free space 25 is important to achieving high levels of post combustion because it enables entrainment of gases in the space above the transition zone 23 into the end region of the lance 13 and thereby increases exposure of available reaction gases to post combustion.

The combined effect of the position of the lance 13, gas flow rate through the lance 13, and upward movement of splashes, droplets and streams of molten material is to shape the transition zone 23 around the lower region of the lance 13—generally identified by the numerals 27. This shaped region provides a partial barrier to heat transfer by radiation to the side walls 5.

Moreover, the ascending and descending droplets, splashes and streams of material is an effective means of transferring heat from the transition zone 23 to the molten bath with the result that the temperature of the transition zone 23 in the region of the side walls 5 is of the order of 1450° C.–1550° C.

The vessel is constructed with reference to the levels of the metal layer 15, the slag layer 16, and the transition zone 23 in the vessel when the process is operating and with reference to splashes, droplets and streams of molten metal and slag that are projected into the top space 31 above the transition zone 23 when the process is operating, so that:

(a) the hearth and the lower barrel section 53 of the side walls 5 that contact the metal/slag layers 15/16 are formed from bricks of refractory material (indicated by the cross-hatching in the figure);

(b) at least part of the lower barrel section 53 of the side walls 5 is backed by water cooled panels 8; and (c) the upper barrel section 51 of the side walls 5 and the roof 7 that contact the transition zone 23 and the top space 31 are formed from water cooled panels 57, 59.

Each water cooled panel 8, 57, 59 in the upper section 10 of the side walls 5 has parallel upper and lower edges and parallel side edges and is curved so as to define a section of the cylindrical barrel. Each panel includes an inner water cooling pipe and an outer water cooling pipe. The pipes are formed into a serpentine configuration with horizontal sections interconnected by curved sections. Each pipe further includes a water inlet and a water outlet. The pipes are displaced vertically so that the horizontal sections of the outer pipe are not immediately behind the horizontal sections of the inner pipe when viewed from an exposed face of the panel, ie the face that is exposed to the interior of the vessel. Each panel further includes a rammed refractory material which fills the spaces between the adjacent horizontal sections of each pipe and between the pipes.

The water inlets and the water outlets of the pipes are connected to a water supply circuit (not shown) which circulates water at high flow rate through the pipes.

In use the operating conditions are controlled so that there is sufficient slag contacting the water cooled panels 57, 59 and sufficient heat extraction from the panels to build-up and maintain a layer of slag on the panels. The slag layer forms an effective thermal barrier to heat loss via the transition zone and the remainder of the top space above the transition zone.

As indicated above, the applicant has identified the following process features in pilot plant work that, separately or in combination, provide effective control of the process.

(a) Controlling the slag inventory, ie the depth of the slag layer and/or the slag/metal ratio, to balance the positive effect of metal in the transition zone 23 on heat transfer with the negative effect of metal in the transition zone 23 on post combustion due to back reactions in the transition zone 23. If the slag inventory is too low the exposure of metal to oxygen is too high and there is reduced potential for post combustion. On the other hand, if the slag inventory is too high the lance 13 will be buried in the transition zone 23 and there will be reduced entrainment of gas into the free space 25 and reduced potential for post combustion.

(b) Controlling the level of dissolved carbon in metal to be at least 3 wt % and maintaining the slag in a strongly reducing condition leading to FeO levels of less than 6 wt % in the slag layer 16 and in the transition zone 23.

(c) Selecting the position of the lance 13 and controlling injection rates of oxygen-containing gas and solids via the lance 13 and lances/tuyeres 11 to maintain the essentially metal/slag free region around the end of the lance 13 and to form the transition zone 23 around the lower section of the lance 13.

(d) Controlling heat loss from the vessel by splashing with slag the side walls of the vessel that are in contact with the transition zone 23 or are above the transition zone 23 by adjusting one or more of:
  (i) the slag inventory; and
  (ii) the injection flow rate through the lance 13 and the lances/tuyeres 11.

The pilot plant work referred to above was carried out as a series of extended campaigns by the applicant at its pilot plant at Kwinana, Western Australia.

The pilot plant work was carried out with the vessel shown in the figure and described above and in accordance with the process conditions described above.

The pilot plant work evaluated the vessel and investigated the process under a wide range of different:
(a) feed materials;
(b) solids and gas injection rates;
(c) slag inventories—measured in terms of the depth of the slag layer and the slag:metal ratios;
(d) operating temperatures; and
(e) apparatus set-ups.

Table 1 below sets out relevant data during start-up and stable operating conditions for the pilot plant work.

|  |  | START UP | STABLE OPERATION |
|---|---|---|---|
| Bath Temperature | (° C.) | 1450 | 1450 |
| Operating Pressure | (bar g) | 0.5 | 0.5 |
| HAB Air | (kNm³/h) | 26.0 | 26.0 |
| Oxygen in HAB | (%) | 20.5 | 20.5 |
| HAB Temperature | (C.) | 1200 | 1200 |
| DSO Ore | (t/h) | 5.9 | 9.7 |
| Coal | (t/h) | 5.4 | 6.1 |
| Calcined Flux | (t/h) | 1.0 | 1.4 |
| Ore Feed Temp | (C.) | 25.0 | 25.0 |
| Hot Metal | (t/h) | 3.7 | 6.1 |
| Slag | (t/h) | 2.0 | 2.7 |
| Post Combustion | (%) | 60.0 | 60.0 |
| Offgas Temperature | (C.) | 1450 | 1450 |
| Heat Transfer to Bath | (MW) | 11.8 | 17.3 |
| Heat Loss to Panels | (MW) | 12.0 | 8.0 |
| Coal Rate | (kg/thm) | 1453 | 1003 |
| Gas Flow Rate from | Nm³/h | 6,200 | 8,600 |
| Metal Layer | Mn³/s/m² | 0.34 | 0.47 |

The iron ore was sourced from Hamersley as a normal fine direct shipping ore and contained 64.6% iron, 4.21% $SiO_2$, and 2.78% $Al_2O_3$ on a dry basis.

An anthracite coal was used both as a reductant and a source of carbon and hydrogen to combust and supply energy to the process. The coal had a calorific value of 30.7 MJ/kg, an ash content of 10%, and a volatile level of 9.5%. Other characteristics included 79.82% total carbon, 1.8% $H_2O$, 1.59% $N_2$, 3.09% $O_2$, and 3.09% $H_2$.

The process was operated to maintain a slag basicity of 1.3 ($CaO/SiO_2$ ratio) using a combination of fluxes of lime and magnesia. The magnesia contributed MgO thereby reducing the corrosiveness of the slag to the refractory by maintaining appropriate levels of MgO in the slag.

Under start-up conditions the pilot plant operated with: a hot air blast rate of 26,000 Nm³/h at 1200° C.; a post combustion rate of 60% (($CO_2+H_2O$)/($CO+H_2+CO_2+H_2O$)); and a feed rate of iron ore fines of 5.9 t/h, a feed rate of coal of 5.4 t/h and a feed rate of flux of 1.0 t/h, all injected as solids using $N_2$ as a carrier gas. There was little or no slag in the vessel and there was not sufficient opportunity to form a frozen slag layer on the side panels. As a consequence, the cooling water heat loss was relatively high at 12 MW. The pilot plant operated at a production rate of 3.7 t/h of hot metal (4.5 wt % C) and a coal rate of 1450 kg coal/t hot metal produced.

Under stable operating conditions, with control of slag inventory and a frozen slag layer on the water cooling panels forming the side walls, relatively low heat losses of 8 MW were experienced. The reduction of the heat lost to the water cooling system allowed an increased productivity to 6.1 t/h of hot metal. The increased productivity was obtained at the same hot air blast rate and post combustion as at start-up. Solid infection rates were 9.7 t/h of ore fines and 6.1 t/h of coal along with 1.4 t/h of flux. The improved productivity also improved the coal rate to 1000 kg coal/t hot metal achieved.

Many modifications may be made to the preferred embodiments of the process of the present invention as described above without departing from the spirit and scope of the present invention.

What is claimed is:

1. A direct smelting process for producing metals from a metalliferous feed material which includes the steps of:
  (a) forming a molten bath having a metal layer and a slag layer on the metal layer in a metallurgical vessel;
  (b) injecting metalliferous feed material and solid carbonaceous material into the molten bath via a plurality of lances/tuyeres;
  (c) smelting metalliferous material to metal in the molten bath;
  (d) causing molten material to be projected as splashes, droplets, and streams into a top space above a nominal quiescent surface of the molten bath to form a transition zone; and
  (e) injecting an oxygen-containing gas into the vessel via one or more than one lance/tuyere to post-combust reaction gases released from the molten bath, whereby the ascending and thereafter descending splashes, droplets and streams of molten material in the transition zone facilitate heat transfer to the molten bath, and whereby the transition zone minimises heat loss from the vessel via the side walls in contact with the transition zone;

and which process includes the step of controlling the process by maintaining a high slag inventory.

2. The process defined in claim 1, including maintaining the high slag inventory by controlling the slag layer to be 0.5 to 4 meters.

3. The process defined in claim 2, including maintaining the high slag inventory by controlling the slag layer to be 1.5 to 2.5 meters deep.

4. The process defined in claim 1, including maintaining the high slag inventory by controlling the slag layer to be at least 1.5 meters deep.

5. The process defined in claim 1, including controlling the weight ratio of metal:slag to be between 4:1 and 1:2.

6. The process defined in claim 1, including controlling the weight ratio of metal:slag to be between 3:1 and 1:1 under stable operating conditions of the process.

7. The process defined in claim 6, including maintaining the high slag inventory by controlling the weight ratio of metal:slag to be between 3:1 and 2:1 under stable operating conditions of the process.

8. The process defined in claim 1, wherein step (c) includes smelting metalliferous material to metal at least predominantly in the metal layer.

9. The process defined in claim 1, including locating the one or more than one oxygen-containing gas lance/tuyere and injecting the oxygen-containing gas at a flow rate so that:
   (a) the oxygen-containing gas is injected towards the slag layer and penetrates the transition zone; and
   (b) the stream of oxygen-containing gas deflects the splashes, droplets and streams of molten material around a lower section of the one or more than one lance/tuyere and a gas continuous space forms around the end of the one or more than one lance/tuyere.

10. The process defined in claim 1, including controlling heat loss from the vessel by splashing predominantly slag onto the side walls of the vessel that are in contact with the transition zone and onto the roof of the vessel by adjusting one or more of:
   (i) the amount of slag in the molten bath;
   (ii) the injection flow rate of the oxygen-containing gas through the one or more than one oxygen-containing gas injection lance/tuyere; and
   (iii) the flow rate of metalliferous feed material and carbonaceous material through the lances/tuyeres.

11. The process defined in claim 1, wherein step (b) includes locating the plurality of lances/tuyeres above and extending downwardly towards the metal layer.

12. The process defined in claim 1, wherein step (b) includes injecting metalliferous material and carbonaceous material into the metal layer via the plurality of lances/tuyeres and thereby causing upward movement of splashes, droplets, and streams of molten material that forms the transition zone as defined by step (d).

13. The process defined in claim 12, including injecting metalliferous feed material and solid carbonaceous material in a carrier gas.

14. The process defined in claim 13, including locating the plurality of lances/tuyeres above and extending downwardly towards the metal layer.

15. A direct smelting process for producing metals from a metalliferous feed material which includes the steps of:
   (a) forming a molten bath having a metal layer and a slag layer on the metal layer in a metallurgical vessel having side walls, said slag layer providing a high inventory in the vessel;
   (b) injecting metalliferous feed material and solid carbonaceous material into the molten bath via a plurality of lances/tuyeres;
   (c) smelting metalliferous material to metal in the molten bath;
   (d) generating a gas flow from the molten bath at a flow rate of at least 0.04 $Nm^3/s/m^2$ of the metal layer area at the interface between the metal layer and the slag layer (under quiescent conditions), which gas flow causes molten material to be projected as splashes, droplets, and streams into a space above a nominal quiescent surface of the molten bath to form a transition zone, the molten material and particularly the slag of the transition zone continuously splashing the side walls and reducing heat loss via the side walls; and
   (e) injecting an oxygen-containing gas into the vessel via one or more than one lance/tuyere to post-combust reaction gases released from the molten bath, whereby the ascending and thereafter descending splashes, droplets and streams of molten material in the transition zone facilitate heat transfer to the molten bath, and whereby the transition zone minimises heat loss from the vessel via the side walls in contact with the transition zone.

16. The process defined in claim 15, including maintaining the high slag inventory by controlling the slag layer to be 0.5 to 4 meters.

17. The process defined in claim 16, including maintaining the high slag inventory by controlling the slag layer to be 1.5 to 2.5 meters deep.

18. The process defined in claim 15, including maintaining the high slag inventory by controlling the slag layer to be at least 1.5 meters deep.

19. The process defined in claim 15, including controlling the weight ratio of metal:slag to be between 4:1 and 1:2.

20. The process defined in claim 15, including controlling the weight ratio of metal:slag to be between 3:1 and 1:1 under stable operating conditions of the process.

21. The process defined in claim 20, including maintaining the high slag inventory by controlling the weight ratio of metal:slag to be between 3:1 and 2:1 under stable operating conditions of the process.

22. The process defined in claim 15, wherein the gas flow rate in at least 0.2 $Nm^3/s/m^2$ of the metal layer area.

23. The process defined in claim 22, wherein the gas flow rate is less than 2 $Nm3/s/m^2$.

24. The process defined in claim 15, wherein step (c) includes smelting metalliferous material to metal at least predominantly in the metal layer.

25. The process defined in claim 15, including locating the one or more than one oxygen-containing gas lance/tuyere and injecting the oxygen-containing gas at a flow rate so that:
   (a) the oxygen-containing gas is injected towards the slag layer and penetrates the transition zone; and
   (b) the stream of oxygen-containing gas deflects the splashes, droplets and streams of molten material around a lower section of the one or more than one lance/tuyere and a gas continuous space forms around the end of the one or more than one lance/tuyere.

26. The process defined in claim 15, including controlling heat loss from the vessel by splashing predominantly slag onto the side walls of the vessel that are in contact with the transition zone and onto the roof of the vessel by adjusting one or more of:
   (i) the amount of slag in the molten bath;
   (ii) the injection flow rate of the oxygen-containing gas through the one or more than one oxygen-containing gas injection lance/tuyere; and
   (iii) the flow rate of metalliferous feed material and carbonaceous material through the lances/tuyeres.

27. The process defined in claim 15, wherein step (b) includes locating the plurality of lances/tuyeres above and extending downwardly towards the metal layer.

28. The process defined in claim 15, wherein step (b) includes injecting metalliferous material and carbonaceous material into the metal layer via the plurality of lances/tuyeres and thereby causing upward movement of splashes, droplets, and streams of molten material that forms the transition zone as defined by step (d).

29. The process defined in claim 28, including injecting metalliferous feed material and solid carbonaceous material in a carrier gas.

30. The process defined in claim 29, including locating the plurality of lances/tuyeres above and extending downwardly towards the metal layer.

* * * * *